United States Patent
Levine et al.

(10) Patent No.: US 10,549,925 B2
(45) Date of Patent: Feb. 4, 2020

(54) APPARATUSES FOR CONVEYING AND DIVERTING CASES

(71) Applicant: Cannon Equipment LLC, Cannon Falls, MN (US)

(72) Inventors: Douglas Levine, Inver Grove Heights, MN (US); Mark Ronald Rosa, Rosemount, MN (US); Gregory Lawrence Nordling, Lakeville, MN (US)

(73) Assignee: Cannon Equipment LLC, Cannon Falls, MN (US)

( * ) Notice: Subject to any disclaimer, the term of this patent is extended or adjusted under 35 U.S.C. 154(b) by 0 days.

(21) Appl. No.: 16/254,722

(22) Filed: Jan. 23, 2019

(65) Prior Publication Data

US 2019/0276246 A1    Sep. 12, 2019

Related U.S. Application Data

(60) Provisional application No. 62/641,717, filed on Mar. 12, 2018.

(51) Int. Cl.
*B65G 47/64* (2006.01)
*B65G 47/26* (2006.01)

(52) U.S. Cl.
CPC ........... *B65G 47/645* (2013.01); *B65G 47/26* (2013.01); *B65G 47/64* (2013.01); *B65G 47/648* (2013.01)

(58) Field of Classification Search
CPC ...... B65G 47/71; B65G 47/26; B65G 47/648; B65G 47/644; B65G 47/64; B65G 47/645

USPC .............................................. 198/442, 369.5
See application file for complete search history.

(56) References Cited

U.S. PATENT DOCUMENTS

| | | | | |
|---|---|---|---|---|
| 2,318,221 A * | 5/1943 | Hayssen | ................ | B65G 47/71 198/442 |
| 3,104,755 A | 9/1963 | Zuercher | | |
| 3,232,417 A | 2/1966 | Muller | | |
| 3,236,361 A | 2/1966 | Hackbarth et al. | | |
| 3,241,651 A * | 3/1966 | Colby | ................ | B65G 47/71 198/437 |
| 3,326,349 A * | 6/1967 | Pettis | ................ | B65G 47/71 198/367 |
| 4,060,165 A * | 11/1977 | Bauer | ................ | B65G 47/71 198/442 |
| 4,147,248 A * | 4/1979 | Kurczak | ................ | B65G 47/71 198/358 |
| 5,186,306 A * | 2/1993 | Sjostrand | ................ | B65G 47/71 198/367 |
| 5,944,165 A * | 8/1999 | Mannlein | ................ | B65G 47/71 198/367 |

(Continued)

Primary Examiner — James R Bidwell
(74) Attorney, Agent, or Firm — Andrus Intellectual Property Law, LLP

(57) ABSTRACT

An apparatus is for conveying cases from an upstream end to one of a first downstream end and a second downstream end. The apparatus includes a conveyor and a diverter assembly that receives the case and dispenses the case toward the first downstream end or the second downstream end. The diverter assembly is pivotable to thereby direct the case toward the first downstream end or the second downstream end, and the diverter assembly is configured to clamp the case to thereby stop conveyance of the case as the diverter assembly pivots and also pivot the case to clear an obstruction presented by an adjacent conveyor.

19 Claims, 10 Drawing Sheets

(56) References Cited

U.S. PATENT DOCUMENTS

| | | | |
|---|---|---|---|
| 6,772,872 B2 * | 8/2004 | Spangenberg | B65G 47/682 198/427 |
| 7,306,087 B1 * | 12/2007 | Hamsten | B65G 47/682 198/369.5 |
| 7,832,544 B2 * | 11/2010 | Kroessmann | A24C 5/35 193/23 |
| 7,963,385 B2 | 6/2011 | Sng et al. | |
| 9,481,516 B1 | 11/2016 | Kraus et al. | |
| 2007/0034478 A1 | 2/2007 | Wolf | |
| 2009/0223779 A1 | 9/2009 | Szarkowski et al. | |
| 2016/0046452 A1 * | 2/2016 | Parker | B65G 47/71 198/442 |
| 2018/0105365 A1 | 4/2018 | Levine et al. | |

\* cited by examiner

APPARATUSES FOR CONVEYING AND DIVERTING CASES

CROSS-REFERENCE TO RELATED APPLICATION

The present application is based on and claims priority to U.S. Provisional Patent Application No. 62/641,717, filed Mar. 12, 2018, the disclosure of which is incorporated herein by reference.

FIELD

The present disclosure relates to an apparatus for conveying and diverting cases.

BACKGROUND

The following U.S. patent application Publication is incorporated herein by reference in entirety.

U.S. Patent Application Publication No. 2018/0105365 discloses chain conveyors with a primary continuous chain having a first portion configured to carry objects along a path and a return portion. A motor is operably coupled to the primary continuous chain so as to induce movement of the chain and a first sprocket engaging the return portion of the primary continuous chain.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter, In certain examples, an apparatus is for conveying cases from an upstream end to one of a first downstream end and a second downstream end. The apparatus includes a conveyor and a diverter assembly that receives the case and dispenses the case toward the first downstream end or the second downstream end. The diverter assembly is pivotable to thereby direct the case toward the first downstream end or the second downstream end, and the diverter assembly is configured to clamp the case to thereby stop conveyance of the case as the diverter assembly pivots and also pivot the case to clear an obstruction presented at an adjacent conveyor.

In certain examples, a method of conveying cases from an upstream end to one of a first downstream end and a second downstream end includes conveying the case on a first conveyor toward the first downstream end and clamping the case, with a diverter assembly, to thereby stop conveyance of the case and pivot the case such that an outer lower edge of the case clears an obstruction presented at a second conveyor. The method further includes the steps of pivoting the diverter assembly such that the case is on the second conveyor, unclamping the case, and conveying the case on the second conveyor toward the second downstream end.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

Liquid-filled containers, such as gallon milk jugs and or pint milk cartons, are loaded into cases, such as plastic dairy cases, at factories. These factories often include a system for transporting the liquid-filled containers and the cases to different processing stations. For example, the system may transport the cases to a washing station where the cases are washed and a loading station where the liquid-filled containers are loaded into washed cases.

The system includes apparatuses, such as track assemblies, which are coupled together to form the path along which the cases and/or the liquid-filled containers are conveyed. The system also includes one or more continuous chain or belt conveyors for conveying the cases and/or the liquid-filled containers along the apparatuses. Through research and experimentation, the present inventors have endeavored to improve conventional apparatuses and thereby improve conveyance of the liquid-filled containers and/or the cases through the system. In particular, the present inventors have recognized that conventional apparatuses may inadvertently cause cases to dislodge or become stuck/jammed in the system as the cases are moved onto and between different continuous chain conveyors. Accordingly, the present inventors have developed the improved apparatuses described hereinbelow.

Figure 1:
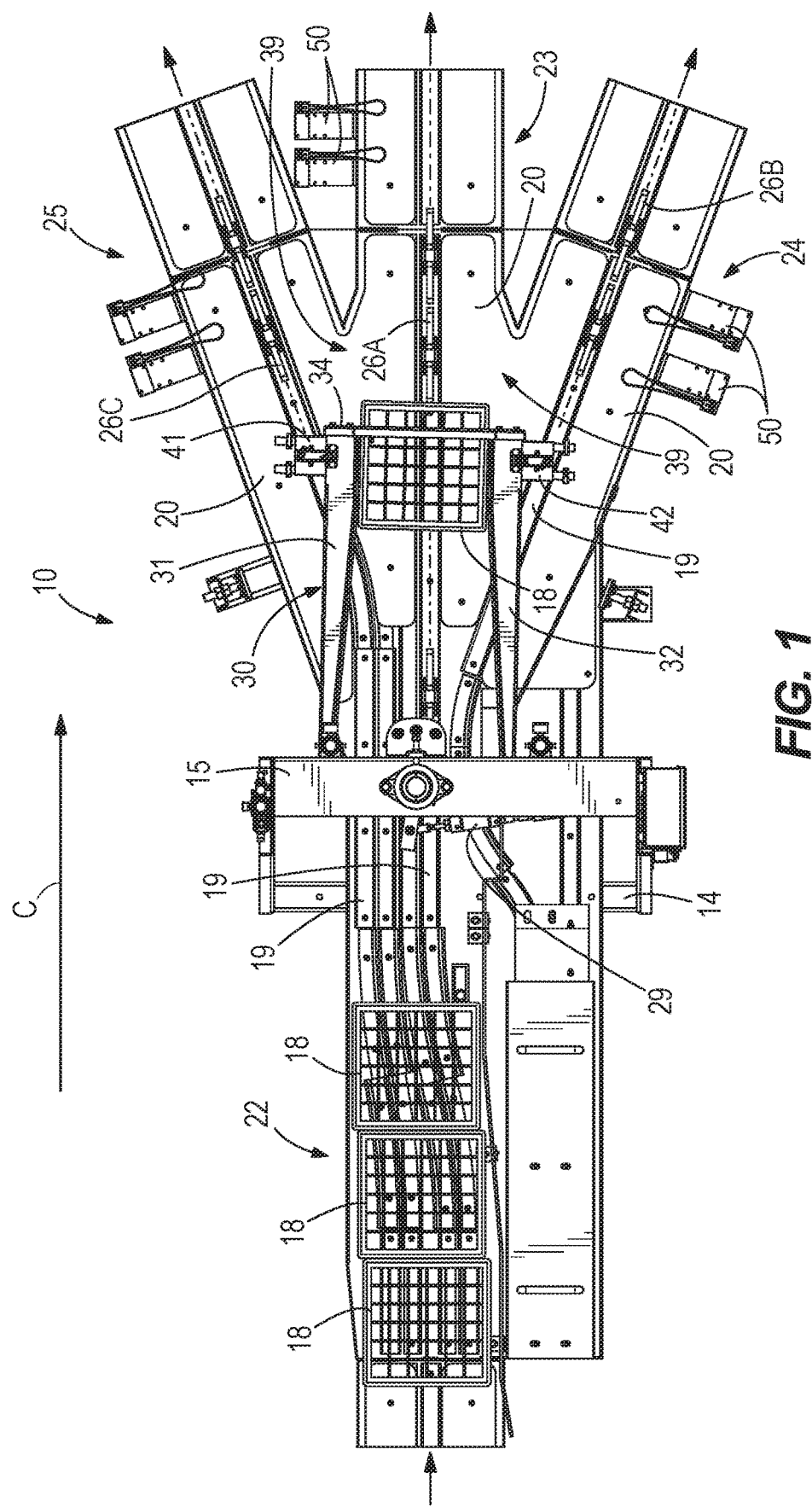
FIG. 1 is a top view of an example apparatus according to the present disclosure.
Figure 2:
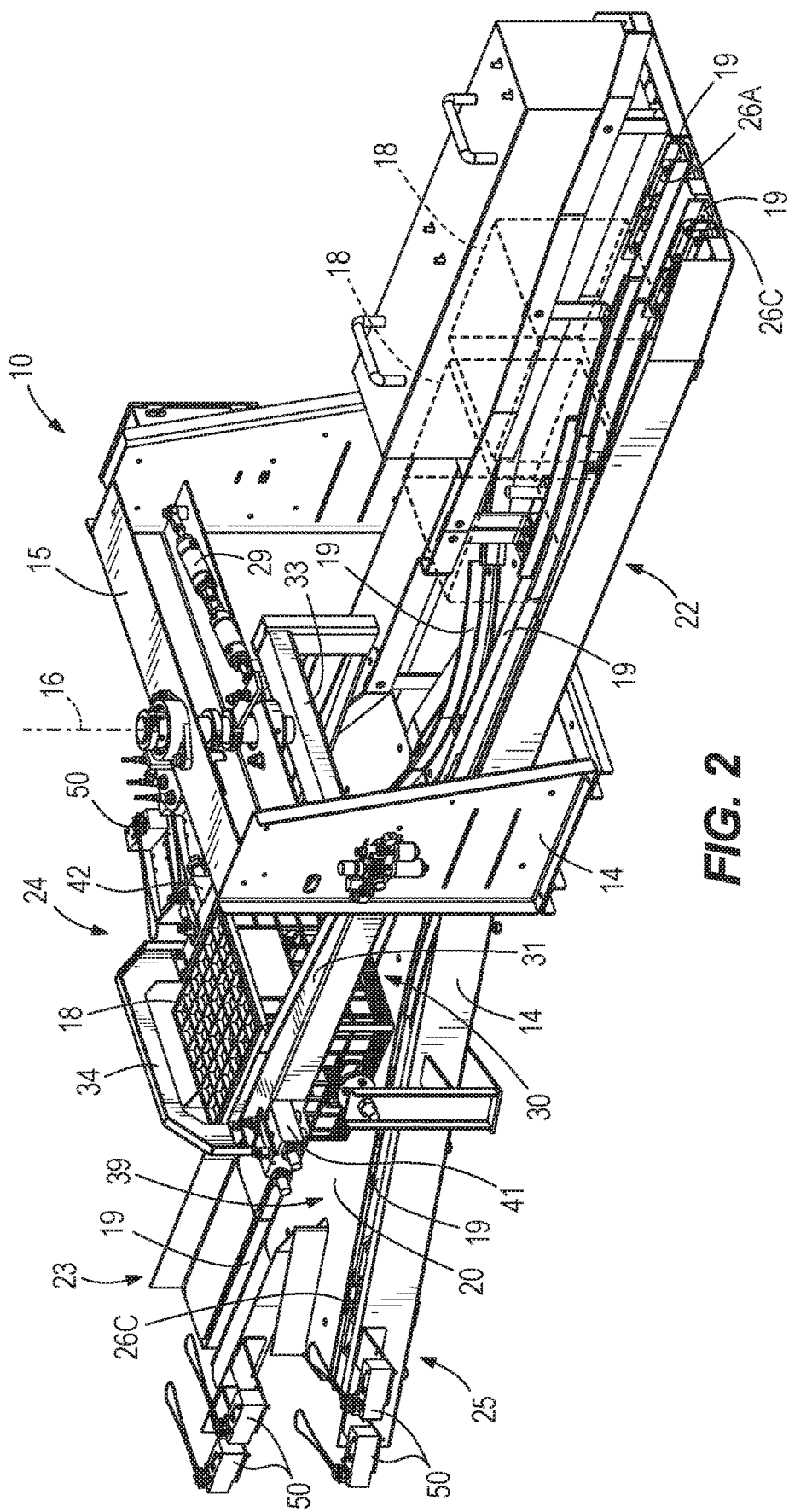
FIG. 2 is a rear perspective view of the apparatus of FIG. 1. One case is shown in solid lines and two cases are shown in dashed lines.

Referring to FIGS. 1-2, an example apparatus 10 is depicted. The apparatus 10 includes an upstream inlet end 22 that receives a flow of cases 18 and one or more downstream outlet ends 23, 24, 25 that dispense the cases 18 to downstream processing stations, such as loading stations (not shown). The cases 18 are conveyed between the inlet end 22 and the outlet ends 23, 24, 25 by one or more conveyors 26A, 26B, 26C. In FIG. 1, three conveyors 26A, 26B, 26C are included with the apparatus 10, and each conveyor 26A, 26B, 26C is for conveying the cases 18 to one of the outlet ends 23, 24, 25. That is, a first conveyor 26A conveys the cases 18 to a first outlet end 23, a second conveyor 26B conveys the cases 18 to a second outlet end 24, and a third conveyor 26C conveys the cases 18 to a third outlet end 25. Note that conveyors 26A, 26B, 26C are shown as chain conveyors that are intermittently shown along the apparatus 10 to expose other components of the apparatus 10 (the conveyors 26A, 26B, 26C are also shown on FIG. 4), however, the type of conveyors may vary.

The conveyors 26A, 26B, 26C are in removable liners 19 which are attached to a support structure 14 (FIG. 2), and plates 20 cover sections of the conveyors 26A, 26B, 26C that travel opposite the direction of travel of the cases 18 (note the direction of travel of the cases 18 is from upstream to downstream through the apparatus 10, as is generally shown by arrow C on FIG. 1). The top surface of the conveyors 26A, 26B, 26C is slightly vertically above the plates 20 such that cases 18 "ride" on the top surface of the conveyors 26A, 26B, 26C (see FIG. 5).

A diverter assembly 30 directs the cases 18 along one of the conveyors 26A, 26B, 26C to one of the outlet ends 23, 24, 25. The diverter assembly 30 is pivotally coupled to a support beam 15 that extends over the conveyors 26A, 26B, 26C. An actuator 29 on the support beam 15 is configured to pivot the diverter assembly 30 about pivot axis 16 (FIG. 2). The type of actuator 29 can vary, and in one example the actuator 29 is a pneumatic cylinder which is connected to a conventional gas regulator (not shown) and a conventional pressurized gas source (not shown).

Figure 3:
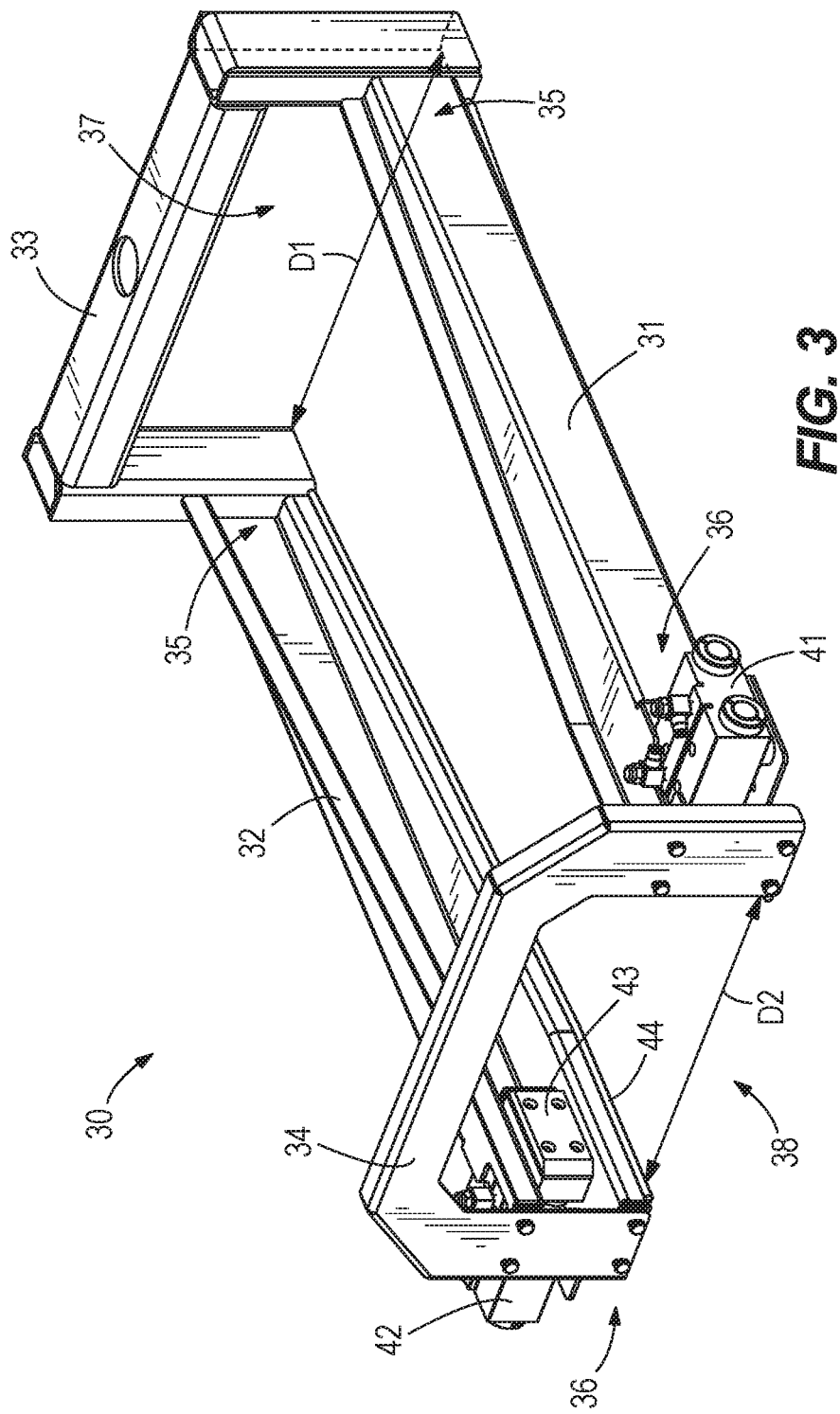
FIG. 3 is a perspective view of an example diverter assembly.

FIG. 3 depicts the diverter assembly 30 in greater detail. The diverter assembly 30 includes a pair of opposing arms, namely a first arm 31 and a second arm 32, coupled to a shoulder member 33 and an opposite cross frame 34. In particular, each arm 31, 32 has a first end 35 coupled to the shoulder member 33 and an opposite second end 36 coupled to the cross frame 34. The first ends 35 of the arms 31 and the shoulder member 33 define an inlet 37 through which the cases 18 are received between the arm 31, 32. The second ends 36 and the cross frame 34 define an outlet 38 through which the cases 18 are dispensed from between the arms 31, 32. The arms 31, 32 are further configured to funnel the cases 18 to the outlet 38. That is, the distance between the arms 31, 32 decreases from the first ends 35 to the second ends 36 of the arms 31, 32 such that that the cases 18 are funneled toward the center of the outlet 38. In one specific example, the distance D1 between first ends 35 of the arms 31, 32 is greater than the distance D2 between the second ends 36 of the arms 31, 32. In certain examples, each arm 31, 32 is tapered from the first end 35 to the second end 36 (see FIG. 1).

Figure 4:
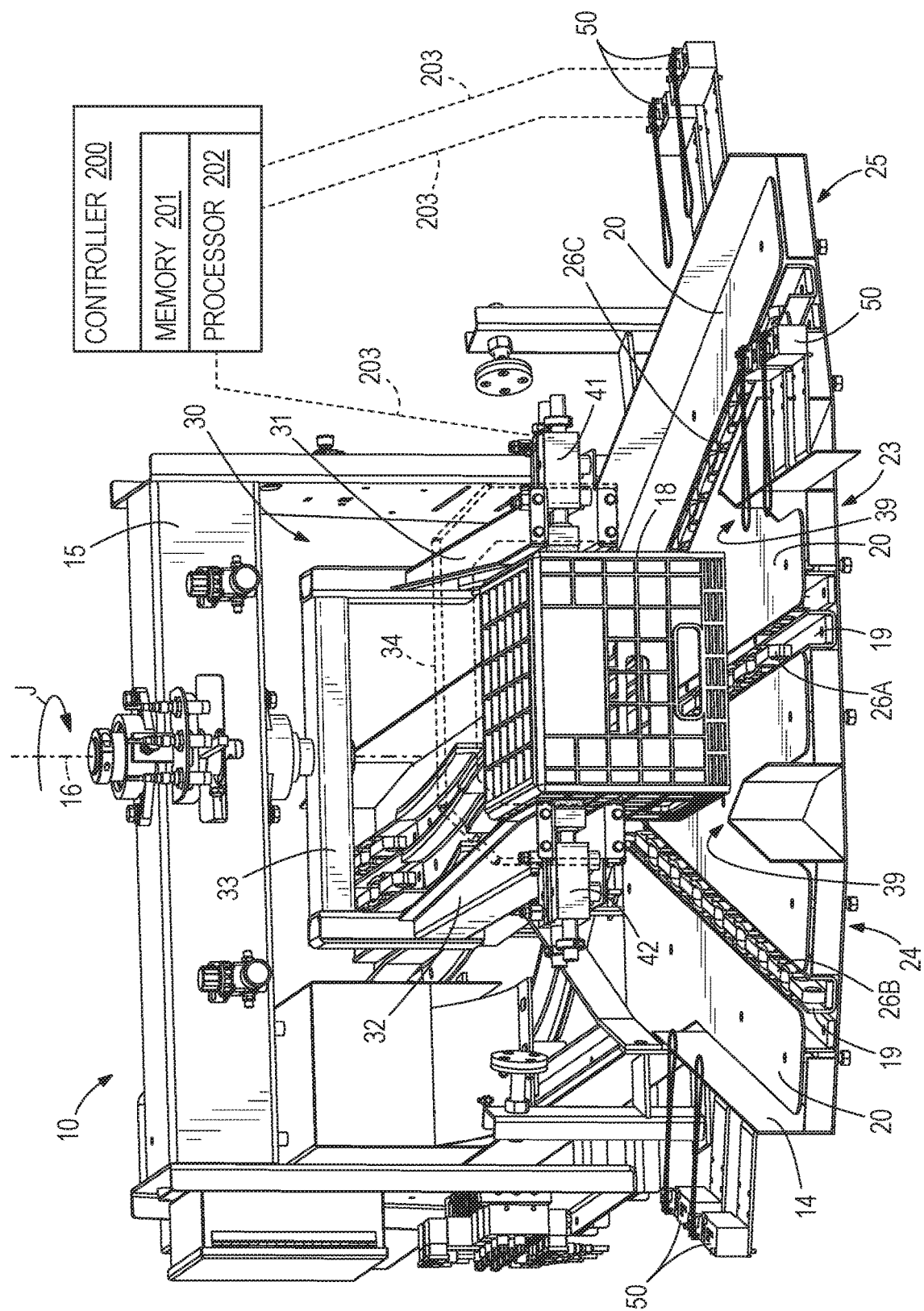
FIG. 4 is a side perspective view of the apparatus of FIG. 1 with a diverter assembly in a first position. A cross frame is shown in dashed lines to permit other components to be shown.

Referring now to FIG. 4, the diverter assembly 30 is pivotable into and between different positions, which are detailed hereinbelow, to thereby direct the cases 18 along one of the conveyors 26A, 26B, 26C and toward one of the outlet ends 23, 24, 25. As such, the diverter assembly 30 is capable of splitting the flow of cases 18 received by the apparatus 10 between the different outlet ends 23, 24, 25 and to thereby supply the processing stations downstream of the outlet ends 23, 24, 25 with a quantity of cases 18 necessary for efficient operation. For example, different processing stations may require different quantities of cases 18 to efficiently operate. In one example, a first processing station fills twenty-five cases per minute with liquid-filled containers and thereby requires a large quantity of cases 18 to operate at this rate. However, a second processing station may only fill seven cases per minute with liquid-filled containers. As such, the diverter assembly 30 directs the cases 18 toward each of the outlet end 23, 24, 25 based on the cases 18 required by the different downstream processing stations.

In addition to directing the cases 18 toward the outlet ends 23, 24, 25, the diverter assembly 30 is configured to selectively clamp one of the cases 18 between the arms 31, 32 to thereby stop the flow of cases 18. The case 18 is advantageously clamped prior to and/or as the diverter assembly 30 is pivoted to prevent cases 18 from being conveyed into the "dead" space (see arrows 39 on FIG. 4) between the conveyors 26A, 26B, 26C and avoid "jamming" the apparatus 10. As is shown in greater detail on FIG. 3, the diverter assembly 30 includes a first clamping device 41 coupled to the second end 36 of the first arm 31 and an opposite clamping device 42 coupled to the second end 36 of the second arm 32 (see FIG. 3). The clamping devices 41, 42 are orientated toward each other, and each clamping device 41, 42 includes a pad 43 made of compressible material that contacts sides of the case 18 (FIG. 4) when the clamping devices 41, 42 actuate. The diverter assembly 30 also includes a pivot member 44 on each arm 31, 32 and is for pivoting the case 18 as one of the clamping devices 41, 42 is actuated (described further herein). The opposing pivot members 44 project toward each other into the space between the arms 31, 32. The size and shape of the pivot members 44 can vary, and the example depicted the pivot members 44 are elongated rods. In one example, the clamping devices 41, 42 are pneumatic cylinders that when actuated cause a piston to extend toward the space between the arms 31, 32 thereby driving the pad 43 toward the opposite clamping device 41, 42 and into contact with the side of the case 18. In this example, the pneumatic cylinders are connected to a gas regulator (not shown) and a pressurized gas source (not shown).

Figure 5:
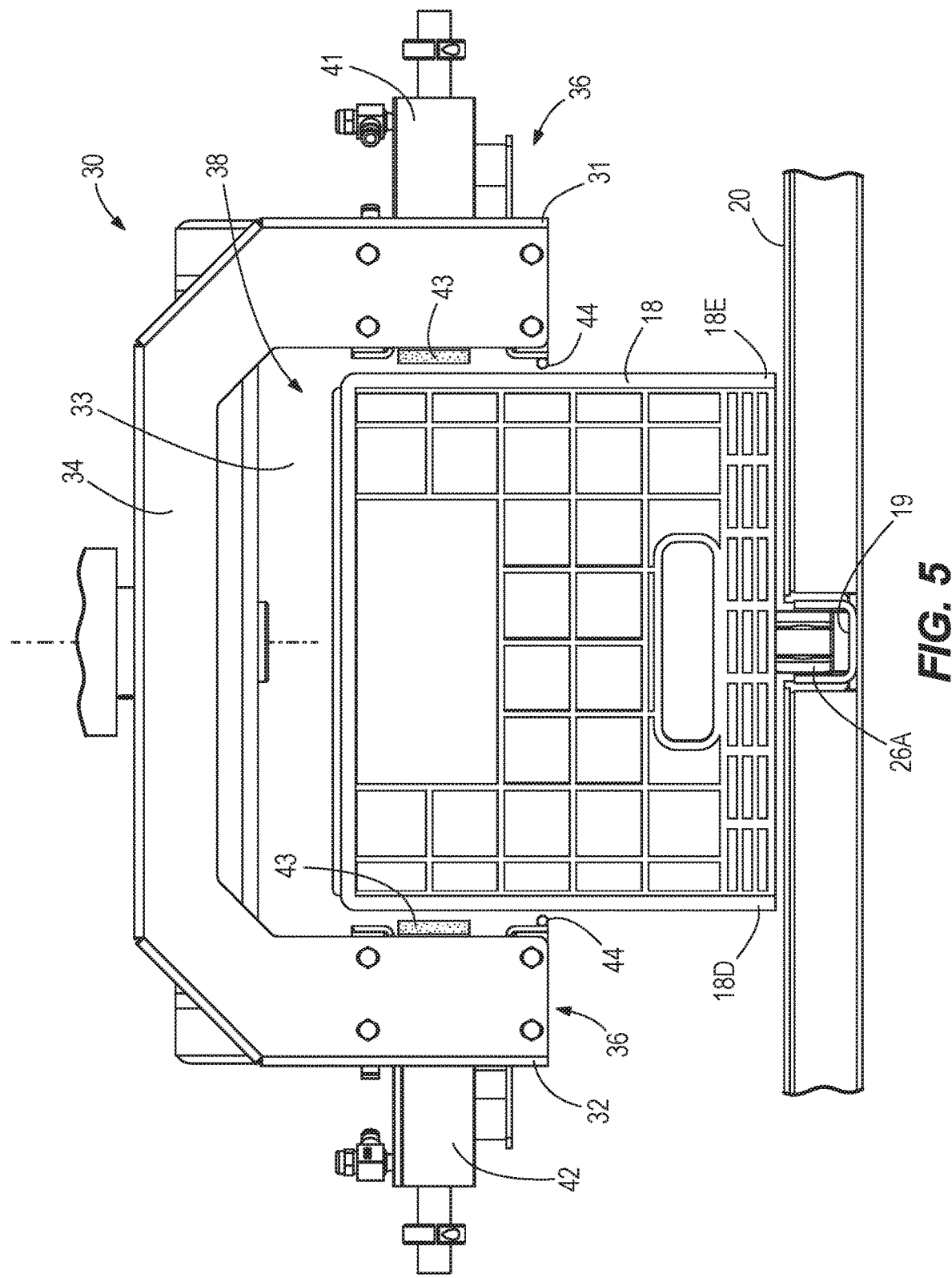
FIG. 5 is a side view of the apparatus of FIG. 1 with the diverter assembly in the first position. The case is shown on a first conveyor.
Figure 6:
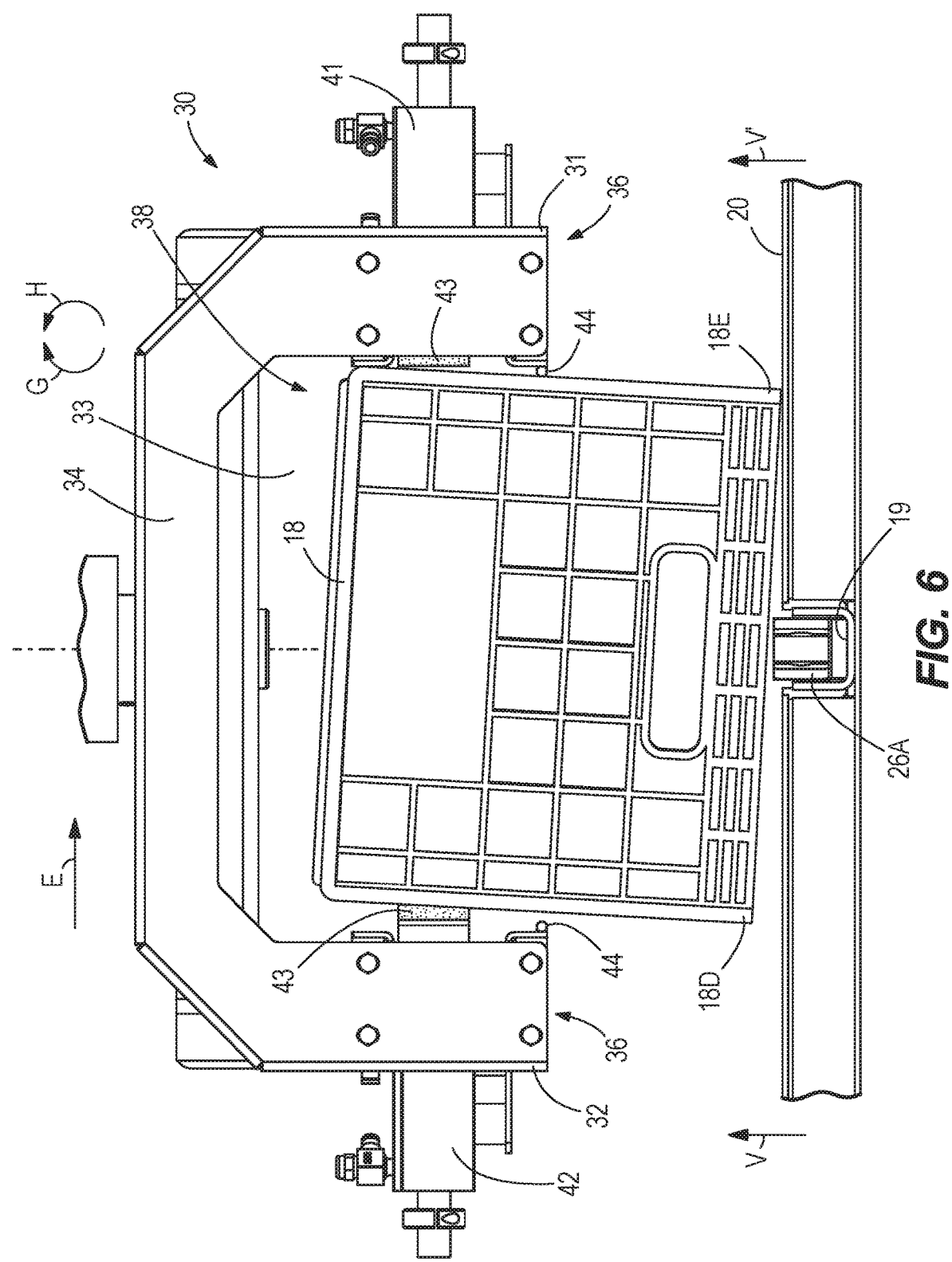
FIG. 6 is a view like FIG. 5. The diverter assembly is shown clamping the case such that a first outer lower edge is vertically raised relative to the first conveyor.

Referring now to FIGS. 5-6, the operation of the clamping devices 41, 42 is shown in greater detail. FIG. 5 depicts the diverter assembly 30 in a first position in which the cases 18 are conveyed by the first conveyor 26A toward the first outlet end 23 (see FIG. 4). The cases 18 are conveyed freely through the outlet 38 and to the corresponding first outlet end 23 (see FIG. 4)

When it is necessary to direct the flow of cases 18 to one of the other outlet ends 24, 25 (see FIG. 4), one of the clamping devices 42 actuates to thereby clamp the case 18 (FIG. 6) and stop the flow of cases 18. Referring to FIG. 6, as the clamping device 42 activates the pad 43 moves toward the case 18 (see arrow E), contacts the case 18, and further moves the case 18 toward the arm 31 opposite the actuating clamping device 42 (note that in the example depicted in FIG. 6 the second clamping device 42 is actuating and moving the case 18 toward the first arm 31). As the case 18 moves toward the arm 31, the case 18 contacts the pivot member 44 opposite the actuating clamping device 42 such that the case 18 pivots about the pivot member 44 in a first direction (see arrow G) and one of the outer lower edges 18D of the case 18 moves in a vertical direction (see arrow V) and the case 18 becomes angled relative to the first conveyor 26A. As such, the case 18 is clamped by the diverter assembly 30. A person of ordinary skill in the art will recognize that in another example, the opposite clamping device 41 (e.g. the first clamping device 41) can actuate to thereby move the case 18 toward the second arm 32 such that the case 18 pivots about the pivot member 44 on the second arm 32 in a second direction (see arrow H) and the other outer lower edge 18E of the case 18 moves in the vertical direction (see FIG. V').

Referring back to FIG. 4, the operation of the diverter assembly 30, including pivoting the diverter assembly 30 and clamping of the case 18, is controlled by a controller 200 which has a memory 201 and a processor 202. The controller 200 is in communication with various components of the apparatus 10 via wired or wireless communication links 203. The controller 200 controls and actuates the actuator 29 (FIG. 2) which pivots the diverter assembly 30 into and between the different positions (described hereinbelow) and the clamping devices 41, 42 which clamps the case 18 between the arms 31, 32. The controller 200 also controls one or more drive systems (not shown) that drive the conveyors 26A, 26B, 26C along the apparatus 10.

In one specific example, the controller 200 is configured to control the diverter assembly 30 and the drive systems for the conveyors 26A, 26B, 26C based signals received from limit switches 50 positioned at each outlet end 23, 24, 25 (see also FIG. 1). Each limit switch 50 is closed when cases 18 are present at the limit switch 50 and open when cases 18 are not present at the limit switch 50. The limit switch 50 sends status signals (e.g. open or closed signals) to the controller 200. When the limit switch 50 at a specific outlet end 23, 24, 25 is open, the controller 200 determines that additional cases 18 should be directed and dispensed toward that specific outlet end 23, 24, 25. As such, the controller 200 will control the diverter assembly 30 (e.g. clamp one of the cases 18 and pivot the diverter assembly 30) to thereby divert and dispense cases 18 to a different outlet end 23, 24, 25 (described further hereinbelow). Conversely, when the limit switch 50 at a specific outlet end 23, 24, 25 is closed, the controller 200 determines that no more cases 18 need be directed and dispensed to that specific outlet end 23, 24, 25. Accordingly, the controller 200 stops the flow of cases 18 toward the outlet end 23, 24, 25 with a closed limit switch 50 by clamping one of the cases 18 and/or pivoting the diverter assembly 30 into a different position such that the cases 18 can be directed toward an outlet ends 23, 24, 25 with an open limit switch 50.

Referring to FIGS. 4-10, operation of the diverter assembly 30 to direct cases 18 toward different outlet ends 23, 24, 25 is shown. FIGS. 4-5 depict the diverter assembly 30 in the first position in which the cases 18 are conveyed by the first conveyor 26A toward the first outlet end 23. As shown in FIG. 5, the clamping devices 41, 42 are not clamping the case 18 and therefore, the cases 18 are freely conveyed by the first conveyor 26A to the first outlet end (FIG. 4) as the first conveyor 26A is driven.

Referring now to FIG. 6, when the controller 200 (FIG. 4) determines that cases 18 should be directed toward the second outlet end 24 (FIG. 4) or no more cases 18 need be directed toward the first outlet end 23 (FIG. 4), the second clamping device 41 is actuated such that the case 18 is clamped by the diverter assembly 30 as described above. Accordingly, the case 18 pivots about the pivot member 44 on the first arm 31 and the outer lower edge 18D of the case 18 facing the second conveyor 26B (FIG. 4) moves in the vertical direction (see arrow V) and the case 18 generally rotates in a first direction (see arrow G). Once the case 18 is clamped, the controller 200 (FIG. 4) then controls the actuator 29 connected to the diverter assembly 30 (FIG. 2) to thereby move the diverter assembly 30 from the first position (FIG. 4) to a second position (FIG. 8) (see arrow J on FIG. 4).

Figure 7:
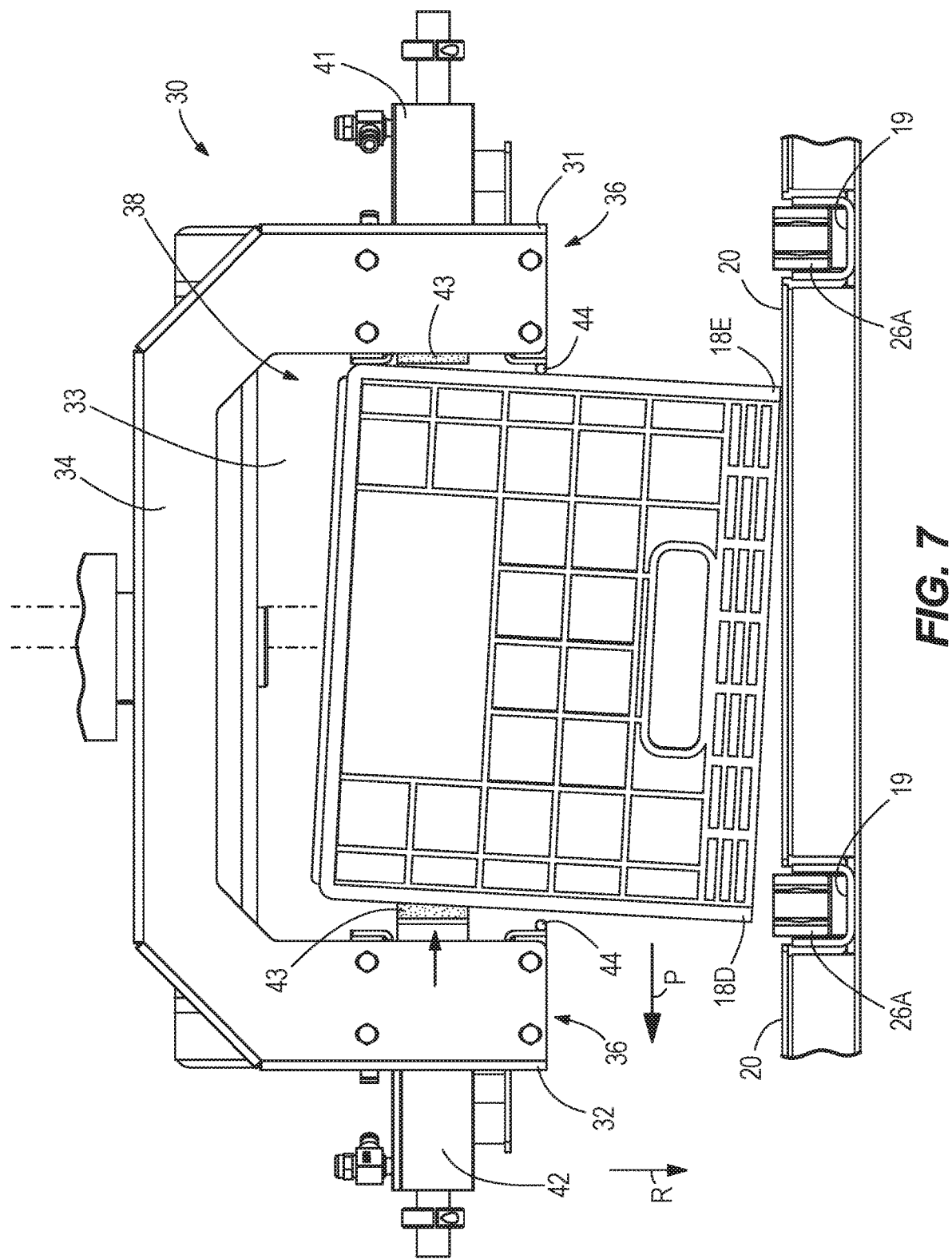
FIG. 7 is a view like FIG. 6. The diverter assembly is shown moving from the first position to a second position.

FIG. 7 depicts the diverter assembly 30 pivoting between the first position (FIG. 4) and the second position (FIG. 8) and the case 18 being moved toward the second conveyor 26B (see arrow P). As the diverter assembly 30 pivots, the case 18 remains clamped such that the outer lower edge 18D is vertically above the second conveyor 26B. The present inventors have recognized it is advantageous to keep the outer lower edge 18D above the second conveyor 26B as the case 18 is moved to thereby prevent the outer lower edge 18B from forcibly contacting an obstruction at the second conveyor 26B which may damage the case 18, dislodge the case 18 from the diverter assembly 30 causing jams, damage the second conveyor 26B, and/or dislodge the second conveyor 26B from the liner 19 (see FIG. 4). As such, the case 18 and/or outer lower edge 18D clears the obstruction at the second conveyor 26B and first contact between the case 18 and the second conveyor 26B occurs along the bottom surface of the case 18 thereby permitting the case 18 to slide onto the top of the second conveyor 26B. The present inventors have also recognized that is advantageous to keep the outer lower edge 18D above the second conveyor 26B to counteract the natural tendency of the case 18 to move vertically downward (see arrow R) toward the conveyors 26A-C due to gravity when the case 18 is not fully secured or clamped by the diverter assembly 30. The obstruction at the second conveyor 26B may be a chain link of the second conveyor 26B, a vertically upwardly projecting portion of a liner 19, a mechanical fastener, and/or the like.

Figure 8:
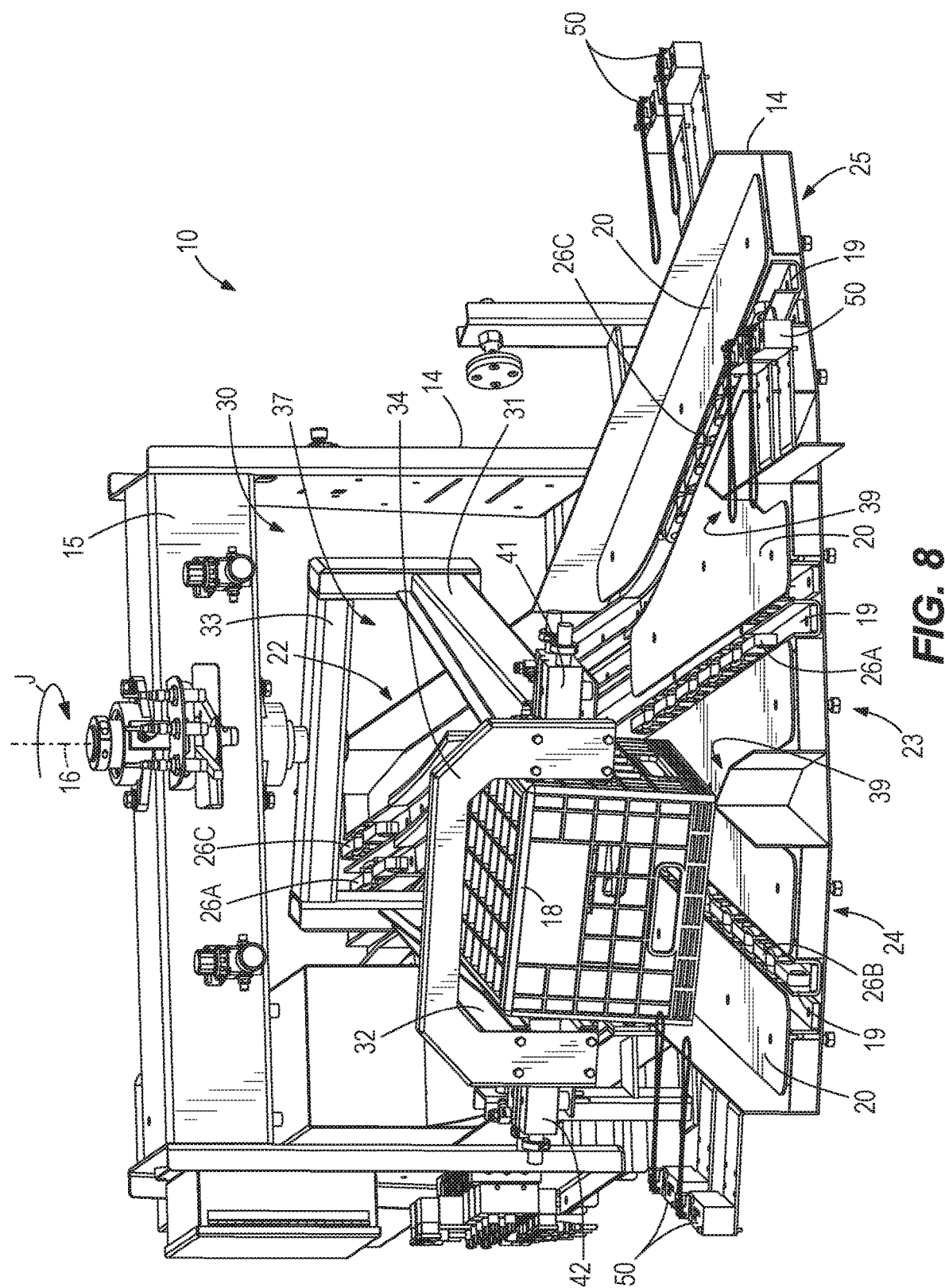
FIG. 8 is a view like FIG. 4. The diverter assembly is shown in the second position, and the case is shown on a second conveyor.

FIG. 8 depicts the diverter assembly 30 in the second position in which the case 18 is on the second conveyor 26B. The second clamping device 42 actuates thereby unclamping the case 18 (similar to FIG. 5). As such, the cases 18 are directed toward the second outlet end 24 and the cases 18 are freely conveyed by the second conveyor 26B to the second outlet end 24 as the second conveyor 26B is driven.

Figure 9:
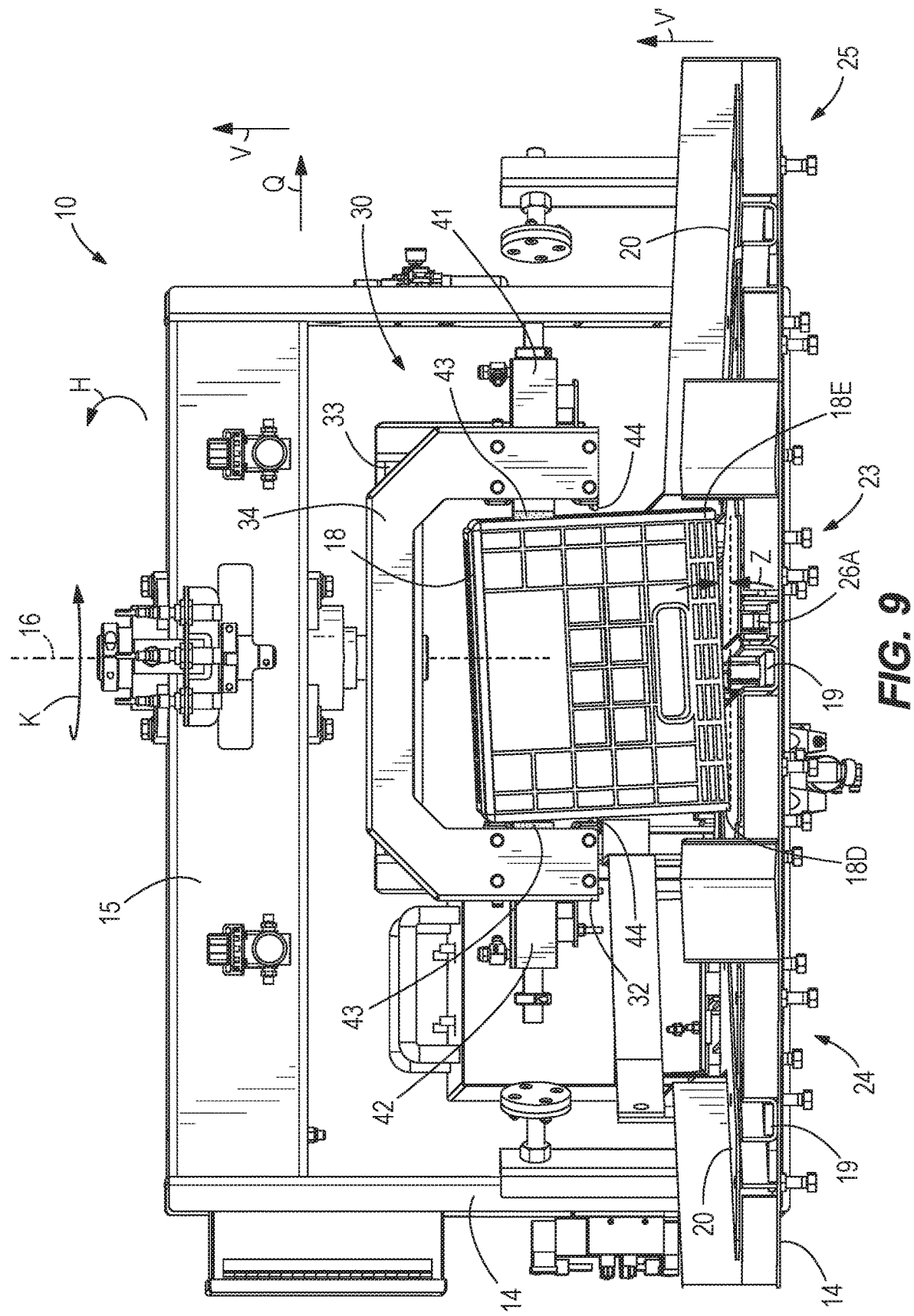
FIG. 9 is a view like FIG. 4. The diverter assembly is shown in the first position and clamping the case such that an opposite second outer lower edge is vertically raised relative to the first conveyor.
Figure 10:
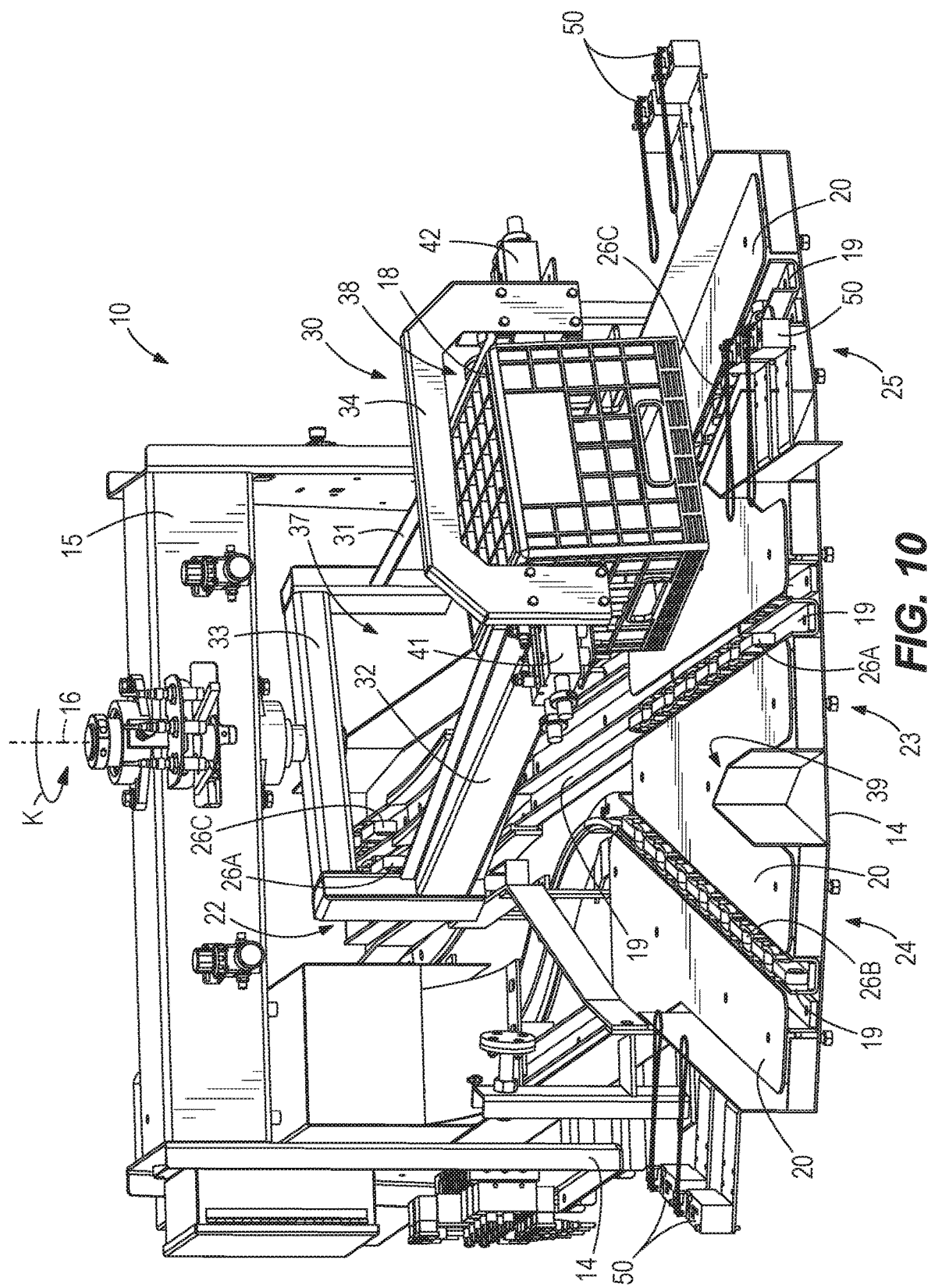
FIG. 10 is a view like FIG. 4. The diverter assembly is shown in a third position, and the case is shown on a third conveyor.

Referring now to FIGS. 9-10, movement of the diverter assembly 30 between the first position (FIG. 9) and a third position (FIG. 10) is depicted. The controller 200 (FIG. 4) controls the diverter assembly 30 to thereby move the diverter assembly 30 from the first position (FIG. 9) and the third position (FIG. 10) when the controller 200 determines cases 18 should be directed toward the third outlet end 25 or no more cases 18 need to directed toward the first outlet end 23. FIG. 9 depicts the diverter assembly 30 in the first position and the case 18 clamped by the diverter assembly 30. The case 18 pivots about the pivot member 44 on the second arm 32 such that the outer lower edge 18E of the case 18 that faces the third conveyor 26C (FIG. 4) moves in the vertical direction (see arrow V' and see the vertical distance between arrows Z-Z) and the case 18 generally rotates in a second direction (see arrow H). Accordingly, the outer lower edge 18E, which faces the direction of movement of the diverter assembly 30 (see arrow Q), is above the third conveyor 26C (FIG. 10). As such, the outer lower edge 18E of the case 18 clears obstructions at the third conveyor 26C as the diverter assembly 30 pivots (see arrow K) into the third position (FIG. 10). Accordingly, the first clamping device 41 actuates thereby unclamping the case 18 (similar to FIG. 5) and the cases 18 are freely conveyed by the third conveyor 26C to the third outlet end 25 as the third conveyor 26C is driven.

In the present description, certain terms may be used for brevity, clarity, and understanding. No unnecessary limitations are to be implied therefrom beyond the requirement of the prior art because such terms are used for descriptive purposes only and are intended to be broadly construed. The different apparatuses, systems, and methods described herein may be used alone or in combination with other apparatuses, systems, and methods. Various equivalence, alternatives, and modifications are possible in the scope of the impended claims.

What is claimed is:

1. An apparatus for conveying cases from an upstream end to one of a first downstream end and a second downstream end, the apparatus comprising:
a conveyor; and
a diverter assembly that receives the case and dispenses the case toward the first downstream end or the second downstream end, wherein the diverter assembly is pivotable to thereby direct the case toward the first downstream end or the second downstream end, and wherein the diverter assembly is configured to clamp the case to thereby stop conveyance of the case as the diverter assembly pivots and also pivot the case to clear an obstruction presented at an adjacent conveyor.

2. The apparatus according to claim 1, wherein the diverter assembly pivots the case such that an outer lower edge of the case clears the obstruction.

3. The apparatus according to claim 2, wherein the diverter assembly pivots the case such that the outer lower edge of the case is vertically above the obstruction.

4. The apparatus according to claim 2, wherein the diverter assembly pivots the case such that the case is angled relative to the conveyor.

5. The apparatus according to claim 2, wherein the diverter assembly has a first pivot member about which the case pivots.

6. The apparatus according to claim 5, wherein the first pivot member is an elongated rod.

7. The apparatus according to claim 5, wherein the diverter assembly pivots the case about the first pivot member as the diverter assembly pivots from a first position to a second position, and further comprising a second pivot member about which the case pivots as the diverter assembly pivots from the second position to the first position.

8. The apparatus according to claim 2, wherein the diverter assembly pivots the case in a first direction as the diverter assembly pivots from a first position in which the diverter assembly directs the case toward the first downstream end to a second position in which the diverter assembly directs the case toward the second downstream end; and
wherein the diverter assembly pivots the case in a second direction as the diverter assembly pivots from the second position to the first position.

9. The apparatus according to claim 8, wherein the diverter assembly comprises:
a first arm and an opposite second arm;
a first clamping device on the first arm that actuates to thereby clamp the case between the first clamping device and the second arm as the diverter assembly pivots from the first position to the second position; and
a second clamping device on the second arm that actuates to thereby clamp the case between the second clamping device and the first arm as the diverter assembly pivots from the second position to the first position.

10. The apparatus according to claim 9, wherein the first arm has a first pivot member about which the case pivots as the second clamping device actuates, and wherein the second arm has a second pivot member about which the case pivots as the first clamping device actuates.

11. The apparatus according to claim 10, wherein the first pivot member is vertically below the first clamping device and the second pivot member is vertically below the second clamping device.

12. The apparatus according to claim 11, wherein the first pivot member and the second pivot member are elongated rods.

13. The apparatus according to claim 9, wherein the first arm and the second arm define an inlet that receives the case and an opposite outlet that dispenses the case, and wherein the first and second arms funnel the case toward the outlet.

14. The apparatus according to claim 13, wherein a distance between the first arm and the second arm at the inlet is greater than a distance between the first arm and the second arm at the outlet.

15. The apparatus according to claim 9, wherein the diverter assembly further comprises a shoulder member coupled to the first arm and the second arm, and wherein the shoulder member has a pivot axis about which the diverter assembly pivots.

16. The apparatus according to claim 9, further comprising an actuator for pivoting the diverter assembly and a controller in communication with the actuator and the first and second clamping devices, and wherein the controller controls one of the first and second clamping devices to thereby clamp the case when the controller actuates the actuator to pivot the diverter assembly.

17. A method of conveying cases from an upstream end to one of a first downstream end and a second downstream end, the method comprising:
conveying the case on a first conveyor toward the first downstream end;
clamping the case, with a diverter assembly, to thereby stop conveyance of the case and pivot the case such that the case clears an obstruction presented at a second conveyor;
pivoting the diverter assembly such that the case is on the second conveyor;
unclamping the case; and
conveying the case on the second conveyor toward the second downstream end.

18. The method according to claim 17, wherein the diverter assembly pivots the case such that an outer lower edge of the case clears the obstruction.

19. The method according to claim 18, wherein the diverter assembly pivots the case about a first pivot member.

* * * * *